United States Patent [19]

Weder et al.

[11] Patent Number: 5,718,081
[45] Date of Patent: Feb. 17, 1998

[54] FLOWER POT COVER WITH CRIMPED PORTION

[75] Inventors: Donald E. Weder, Highland; William F. Straeter, Breese, both of Ill.

[73] Assignee: Southpac Trust International, Inc.

[21] Appl. No.: 463,905

[22] Filed: Jun. 5, 1995

Related U.S. Application Data

[63] Continuation-in-part of Ser. No. 687,701, Apr. 18, 1991, abandoned, and a division of Ser. No. 306,558, Sep. 15, 1994, Pat. No. 5,509,188, which is a continuation of Ser. No. 940,930, Sep. 4, 1992, Pat. No. 5,361,482, which is a continuation-in-part of Ser. No. 926,098, Aug. 5, 1992, Pat. No. 5,344,016, which is a continuation-in-part of Ser. No. 803,318, Dec. 4, 1991, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned, said Ser. No. 687,701, is a continuation-in-part of Ser. No. 649,263, Jan. 30, 1991, abandoned, which is a continuation of Ser. No. 248,960, Sep. 26, 1988, abandoned, which is a continuation-in-part of Ser. No. 219,083, Jul. 13, 1988, Pat. No. 4,897,031.

[51] Int. Cl.⁶ ............................... B65B 25/02; A01G 9/02
[52] U.S. Cl. ...................... 47/72; 47/41.01; 47/41.1; D11/143; D11/152
[58] Field of Search ........................... 47/66 R, 41.1, 47/41.01, 72; D11/143, 152, 153; 428/343

[56] References Cited

U.S. PATENT DOCUMENTS

| | | | |
|---|---|---|---|
| D. 314,732 | 2/1991 | Weder | D11/143 X |
| D. 365,305 | 12/1995 | Weder et al. | D11/143 X |
| D. 366,009 | 1/1996 | Weder et al. | D11/143 X |
| D. 366,631 | 1/1996 | Weder et al. | D11/152 X |
| 2,302,259 | 11/1942 | Rothfuss | 41/10 |
| 2,621,142 | 12/1952 | Wetherell | 154/117 |
| 2,648,487 | 8/1953 | Linda | 229/55 |
| 3,376,666 | 4/1968 | Leonard | 47/41 |
| 3,557,516 | 1/1971 | Brandt | 53/14 |
| 4,733,521 | 3/1988 | Weder et al. | 53/580 |
| 4,771,573 | 9/1988 | Stengel | 47/67 |
| 4,773,182 | 9/1988 | Weder et al. | 47/72 |

(List continued on next page.)

FOREIGN PATENT DOCUMENTS

| | | |
|---|---|---|
| 1376047 | 9/1964 | France . |
| 1393725 | 2/1965 | France . |
| 2137325 | 12/1972 | France . |
| 2467796 | 4/1981 | France . |
| 2619698 | 3/1989 | France . |
| 8905250 | 10/1989 | Germany . |
| 1096058 | 12/1967 | United Kingdom . |
| 9003311 | 4/1990 | WIPO . |

OTHER PUBLICATIONS

Ex. A—Color Them Happy With Highlander® Products, ©1992, 2 Pages.
Ex. B—Super Seller, Supermarket Floral, Sep. 15, 1992.
Ex. C—Costa Keeps the Christmas Spirit, Supermarket Floral, Sep. 15, 1992.
Ex. D—Now, More Than Ever, Supermarket Floral, Sep. 15, 1992.
Ex. E—Halloween, Link Magazine, Sep. 1992, 2 pages.
Ex. F—Speed Cover® Brochure—The Simple Solution . . . , ©1989.
Ex. G—Speed Sheets and Speed Rolls Brochure, ©1990.

*Primary Examiner*—Daniel Zirker
*Attorney, Agent, or Firm*—Dunlap & Codding, P.C.

[57] ABSTRACT

A flower pot cover consisting of a base and a skirt. The base has an upper end and a lower end with a pot opening being formed through the upper end of the base providing access to a pot receiving space. The skirt is connected to the upper end of the base and the skirt extends a distance outwardly from the base terminating with an outer periphery. A bonding material is disposed on the skirt or the base or both. A flower pot is disposed in the pot receiving space and the portion of the skirt and/or the base having the bonding material thereon is crimped to provide a crimped portion for cooperating to maintain the flower pot cover connected to the flower pot.

38 Claims, 2 Drawing Sheets

U.S. PATENT DOCUMENTS

| | | | |
|---|---|---|---|
| 4,801,014 | 1/1989 | Meadows | 206/423 |
| 4,835,834 | 6/1989 | Weder | 29/525 |
| 4,950,216 | 8/1990 | Weder | 47/41.01 X |
| 4,980,209 | 12/1990 | Hill | 428/34.1 |
| 5,111,638 | 5/1992 | Weder | 53/397 |
| 5,181,364 | 1/1993 | Weder | 53/397 |
| 5,361,482 | 11/1994 | Weder et al. | 29/469.5 |
| 5,381,642 | 1/1995 | Weder et al. | 47/72 X |

5,718,081

FLOWER POT COVER WITH CRIMPED PORTION

RELATED REFERENCES

This application is a divisional of U.S. Ser. No. 08/306,558, filed on Sep. 15, 1994, now U.S. Pat. No. 5,509,188, which is a continuation of U.S. Ser. No. 07/940,930 filed Sep. 4, 1992, now U.S. Pat. No. 5,361,482, which is a continuation-in-part of U.S. Ser. No. 07/926,098, filed Aug. 5, 1992, entitled "METHOD AND APPARATUS FOR FORMING A DECORATIVE COVER", now U.S. Pat. No. 5,344,016 which is a continuation-in-part of U.S. Ser. No. 803,318, filed Dec. 4, 1991, entitled "WRAPPING MATERIAL FOR WRAPPING A FLORAL GROUPING HAVING STAGGERED STRIPS OF ADHESIVE APPLIED THERETO AND METHOD", which is a continuation-in-part of U.S. Ser. No. 707,417, filed May 28, 1991, now abandoned, entitled "WRAPPING A FLORAL GROUPING WITH SHEETS HAVING ADHESIVE OR COHESIVE MATERIAL APPLIED THERETO", which is a continuation of U.S. Ser. No. 502,358, filed Mar. 29, 1990, now abandoned, entitled "WRAPPING A FLORAL GROUPING WITH SHEETS HAVING ADHESIVE OR COHESIVE MATERIAL APPLIED THERETO", which is a continuation-in-part of U.S. Ser. No. 391,463, filed Aug. 9, 1989, now abandoned, entitled "ADHESIVE APPLICATOR," which is a continuation-in-part of U.S. Ser. No. 249,761, filed Sep. 26, 1988, now abandoned, entitled "METHOD FOR WRAPPING AN OBJECT IN A MATERIAL HAVING PRESSURE SENSITIVE ADHESIVE THEREON".

This Application is also a continuation-in-part of U.S. Ser. No. 07/687,701, filed Apr. 18, 1991, now abandoned, entitled, "WRAPPING MATERIAL HAVING A SHAPE SUSTAINING ELEMENT AND METHOD"; which is a continuation in part of application Ser. No. 649,263, filed Jan. 30, 1991, now abandoned; which is a continuation of application Ser. No. 248,960, filed Sep. 26, 1988, now abandoned; which is a continuation in part of application Ser. No. 219,083, filed Jul. 13, 1988, now U.S. Pat. No. 4,897,031.

FIELD OF THE INVENTION

The present invention relates generally to flower pot covers for providing decorative coverings for flower pots and, more particularly, but not by way of limitation, to a flower pot cover having a bonding material thereon where the portion of the flower pot cover having the bonding material thereon is crimped to provide a crimped portion for cooperating to hold the flower pot cover disposed about the flower pot.

DESCRIPTION OF THE PREFERRED EMBODIMENTS

Figure 1:
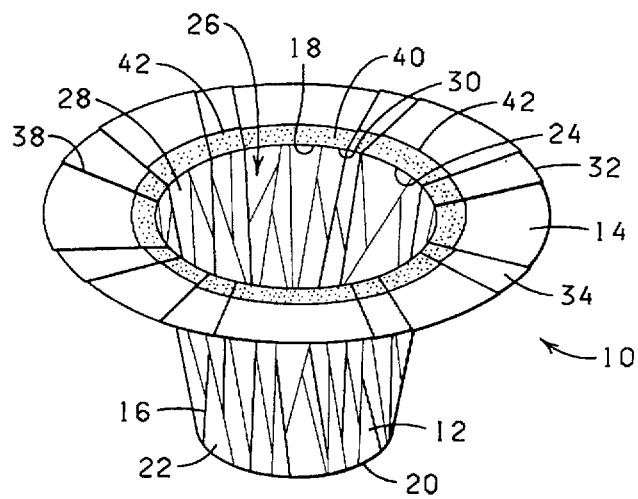
FIG. 1 is a perspective view of a flower pot cover constructed in accordance with the present invention.
Figure 2:
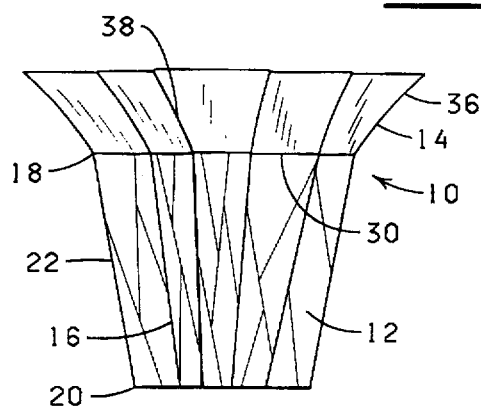
FIG. 2 is an elevational view of the flower pot cover of FIG. 1.

Shown in FIGS. 1 and 2 and designated therein by the general reference numeral 10 is a flower pot cover constructed in accordance with the present invention. The flower pot cover 10 comprises a base 12 and a skirt 14.

In one preferred form, the flower pot cover 10 is formed by taking a sheet of material and placing it between a male and a female mold. In this embodiment, the male mold is brought into mating engagement with the female mold thereby forming the flower pot cover 10. In this process, a plurality of overlapping folds 16 (FIGS. 1 and 2) are formed in the base 12. The overlapping folds 16 cooperate to maintain the structural integrity of the base 12 and cooperate to maintain the base 12 in the preformed shape. Apparatus and methods for forming a flower pot cover as just described are disclosed in detail in U.S. Pat. No. 4,773,182, titled "ARTICLE FORMING SYSTEM" issued Sep. 27, 1988 and assigned to the Assignee of the present invention and the disclosure of this Patent hereby specifically is incorporated herein by reference.

The base 12 has an upper end 18, a lower end 20 and an outer peripheral surface 22. A pot opening 24 (FIG. 1) is formed through the upper end 18 of the base 12 providing access to a pot receiving space 26 (FIG. 1). The pot receiving space 26 forms an inner peripheral surface in the base 12. As shown in FIGS. 1 and 2, the base 12 is generally cylindrically shaped, although the base 12 could be any geometric shape as may be desired in a particular application.

Figure 3:
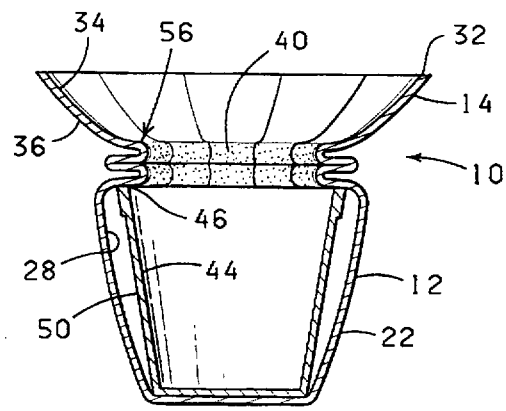
FIG. 3 is a sectional view of a flower pot with the flower pot cover of FIGS. 1 and 2 placed thereabout and with a crimped portion formed in the flower pot cover.

In a preferred manner, the skirt 14 is formed integrally with the base 12. The skirt 14 is connected to the upper end 18 of the base 12 at a connection 30 (FIG. 1) between the upper end 18 of the base 12 and the skirt 14. The skirt 14 extends a distance radially outwardly from the base 12 terminating with an outer periphery 32 (FIGS. 1 and 3). The skirt 14 has an inner peripheral surface 34 (FIGS. 1 and 3) and an outer peripheral surface 36 (FIGS. 2 and 3). In one form, shown in FIGS. 1 and 2, a plurality of folds 38 also are formed in the skirt 14 with most of the folds 38 extending radially outwardly from the upper end 18 of the base 12 toward the outer periphery 32 of the skirt 14.

The base 12 and the skirt 14 may be constructed of any suitable material that is capable of being formed into the flower pot cover 10.

Preferably, the material from which the flower pot cover 10 is constructed is a material selected from a group of materials consisting of paper, metal foil, cloth (natural or synthetic), denim, burlap or polymer film or combinations thereof.

The term "polymer film" as used herein means any polymer film. For example, but not by way of limitation, one polymer film is a polypropylene film. Another example of a polymer film, but not by way of limitation, is cellophane.

The material has a thickness in a range from about 0.1 mils to about 30 mils. Preferably, the material has a thickness in a range from about 0.1 mils to about 5 mils.

The material may be any geometric shape. The material may be constructed of a single layer of material or a plurality of layers of the same or different types of materials. Any thickness of the material or, in other words, the flower pot cover 10 may be utilized in accordance with the present invention as long as the material is formable into the flower pot cover 10 in some manner. The layers of material comprising the flower pot cover 10 may be connected together or laminated or may be separate layers.

A decorative pattern, such as a color and/or an embossed pattern, and/or other decorative surface ornamentation may be applied to the inner peripheral surfaces 28 and 34 and/or the outer peripheral surfaces 22 and 36 of the flower pot cover 10 or portions thereof including, but not limited to printed design, coatings, colors, flocking or metallic finishes. The sheet of material also may be totally or partially clear or tinted transparent material.

A bonding material 40 (FIG. 1) is disposed on a portion of the inner peripheral surface 34 of the skirt 14. The bonding material 40 more particularly is disposed near the connection 30 between the skirt 14 and the upper end 18 of the base 12. The bonding material 40 covers an area extending from the connection 30 of the skirt 14 to the upper end 18 of the base 12 a distance radially outwardly to a line 42 (FIG. 1) spaced a distance radially outwardly from the connection 30. Although the bonding material 40 is shown in FIGS. 1 and 2 in the form of a continuous strip of the bonding material 40, the bonding material 40 may be in the form of spots or spaced apart strips or any other form desired in a particular application suitable for effecting the crimping described below.

The term "bonding material" as used herein means an adhesive, preferably a pressure sensitive adhesive or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the flower pot cover 10 and, in this instance, heat also must be applied to effect the sealing. The term "bonding material" as used herein means any type of material or thing which can be used to effect the bonding or connecting of the two adjacent portions of the flower pot cover 10 to effect the connection or bonding described herein. The term "bonding material" also includes labels, bands, ribbons, strings, tape, staples or combinations thereof.

As mentioned before, the bonding material 40 preferably is an adhesive or cohesive. More particularly, the bonding material 40 preferably is a cohesive. When the bonding material 40 is a cohesive, a plurality of the flower pot covers 10 may be stacked one on top of the other with the base 12 of an adjacent flower pot cover being disposed in the pot receiving space 26 of an adjacent flower pot cover 10. When the bonding material 40 is a cohesive, the bonding material 40 will not cause one flower pot cover 10 to be bonded to an adjacent flower pot cover 10 when the flower pot covers 10 are stacked in the manner just described.

The bonding material 40 may be applied to the sheet of material prior to forming the sheet of material into the flower pot cover 10 or the bonding material 40 may be applied during the forming of the sheet of material into the flower pot cover 10 or the bonding material 40 may be applied after the flower pot cover 10 has been formed.

As mentioned before, the flower pot cover 10 is adapted and configured to be used with a flower pot, a flower pot being shown in FIG. 3 and designated therein by the referenced numeral 44. As shown in FIG. 3, the flower pot 44 has an upper end 46, a lower end 48, an outer peripheral surface 50 with an opening 52 being formed through the upper end 46 of the flower pot 44 providing access to a plant or flower receiving space 54.

In use, the lower end 48 of the flower pot 44 is disposed through the pot opening 24 and into the pot receiving space 26 of the flower pot cover 10 to a position wherein the lower end 48 of the flower pot 44 is disposed near the lower end 20 of the flower pot cover 10 and the upper end 46 of the flower pot 44 is disposed near the upper end 18 of the flower pot cover 10.

After the flower pot 44 has been disposed in the pot receiving space 26, a crimped portion 56 (FIG. 3) is formed in the skirt 14 by bringing together adjacent portions of the skirt 14 about the bonding material 40 thereby causing the adjacent portions to be bonded together for forming the crimped portion 56. The crimping of the skirt 14 may be accomplished by hand or with a device or machine as may be desired in a particular application.

The crimped portion 56 extends a distance radially inwardly above the upper end 46 of the flower pot 44. The crimped portion 56 is disposed about adjacent the upper end 46 of the flower pot 44 and the crimped portion 56 engages a portion of the upper end 46 of the flower pot 44 for cooperating to maintain the flower pot cover 10 assembled around or connected to the flower pot 44.

The crimped portion 56 preferably extends circumferentially about the upper end 18 of the flower pot cover 10 and preferably circumferentially around the upper end 46 of the flower pot 44. In some applications, it may be desirable to form the crimped portion 56 only at certain positions spaced circumferentially about the upper end 18 of the base 12.

The flower pot cover 10 substantially encompasses the flower pot 44 when the flower pot 44 is disposed in the pot receiving space 26.

EMBODIMENT OF FIGS. 4 AND 5

Figure 4:
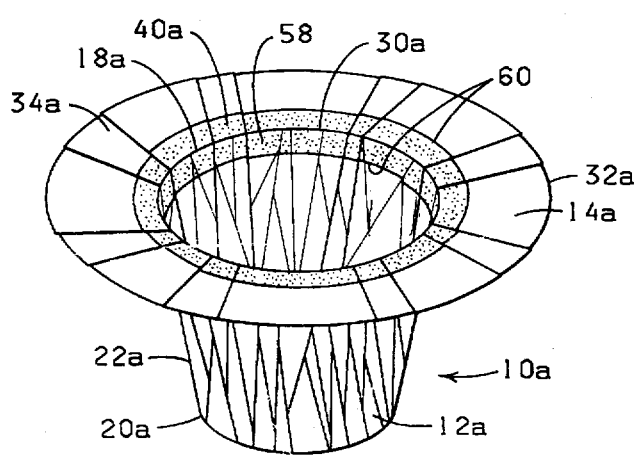
FIG. 4 is a perspective view of a modified flower pot cover constructed in accordance with the present invention.
Figure 5:
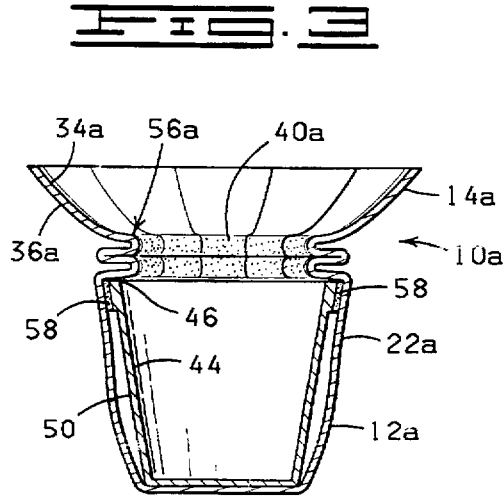
FIG. 5 is a sectional view showing the flower pot cover of FIG. 4 placed about a flower pot with the flower pot cover having a crimped portion formed therein.

Shown in FIGS. 4 and 5 is a modified flower pot cover 10a which is constructed exactly like the flower pot cover 10 shown in FIGS. 1, 2 and 3 and described in detail before, except the flower pot cover 10a also includes a bonding material 58 disposed on the inner peripheral surface 28 of the base 12 near the upper end 18 of the base 12 in addition to the bonding material 40a disposed on the inner peripheral surface 34a of the skirt 14a.

The bonding material 58 extends from the upper end 18a of the base 12 a distance toward the lower end 20a of the base 12a to a line 60 disposed near and spaced a distance from the upper end 18a of the base 12a. The bonding material 58 extends circumferentially about the upper end 18a of the base 12a. The bonding material 58 substantially covers the entire area between the upper end 18a of the base 12a and the line 60. It should be noted that the bonding material 58, although shown as a continuous strip in FIG. 4, could be spots or spaced apart strips if desired in a particular application.

In operation, as illustrated in FIG. 5, the flower pot cover 10a is disposed about the flower pot 44 in the manner described before in connection with the flower pot 10 shown in FIGS. 1, 2 and 3, and the crimped portion 56a is formed in the flower pot cover 10a in a manner exactly like that described before in connection with the flower pot cover 10 and the crimped portion 56 shown in FIG. 3. In addition, the bonding material 58 on the inner peripheral surface 28a of the base 12a bondingly engages to a portion of the outer peripheral surface 50 of the flower pot 44 near the upper end 46 of the flower pot 44. The bonding engagement between the bonding material 58 and the flower pot 44 further cooperates to secure the flower pot cover 10a to the flower pot 44.

In those instances where the bonding material 58 is a cohesive, a cohesive material also is included on the outer peripheral surface 50 of the flower pot 44 for bondingly engaging with the bonding material 58 on the flower pot cover 10a.

EMBODIMENT OF FIGS. 6 AND 7

Figure 6:
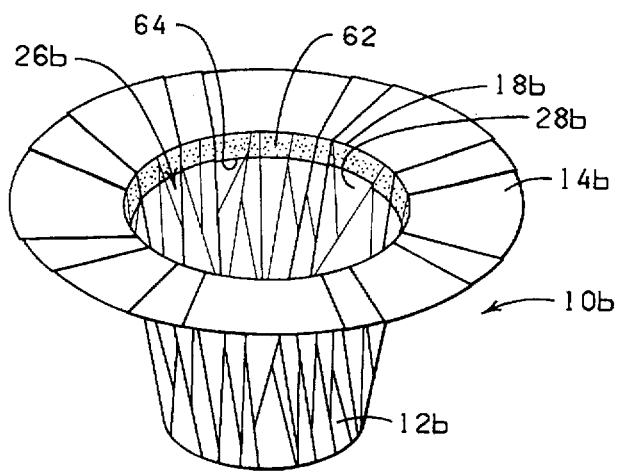
FIG. 6 is a perspective view of yet another modified flower pot cover.

Shown in FIG. 6 is another modified flower pot cover 10b which is constructed exactly like the flower pot cover 10 shown in FIGS. 1 and 2, except the flower pot cover 10b does not include bonding material on the skirt 14b like the bonding material 40 on the skirt 14 shown in FIGS. 1 and 2. Rather, the flower pot cover 10b includes bonding material 62 disposed on the inner peripheral surface 28b of the flower pot cover 10b near the upper end 18b of the base 12b. The bonding material 62 extends circumferentially about the upper end 18b of the base 12b. The bonding material 62 extends from the upper end 18b to a line 64 spaced a distance from the upper end 18b of the base 12b. The bonding material 62 substantially covers the entire area between the upper end 18b and the line 64. The bonding material 62 could be in the form of spots or spaced apart strips if desired in a particular application.

Figure 7:
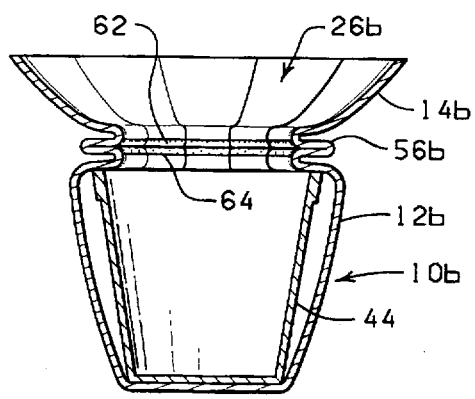
FIG. 7 is a sectional view showing the flower pot cover of FIG. 6 disposed about a flower pot with a crimped portion being formed in the flower pot cover.

In use, the flower pot 44 is disposed in the pot receiving space 26b of the flower pot cover 10b, as shown in FIG. 7. The crimped portion 56b is formed in the flower pot cover 10b by crimping together portions of the flower pot cover 10b near the bonding material 62 with the bonding material 62 cooperating to bond the overlapping crimped portions for maintaining the shape of the crimped portion 56b in a manner like that described before. In this application, the crimped portion 56b is formed in the base 12b, rather than in the skirt 14b as is the case in connection with the flower pot cover 10 shown in FIGS. 1, 2 and 3.

EMBODIMENT OF FIG. 8

Figure 8:
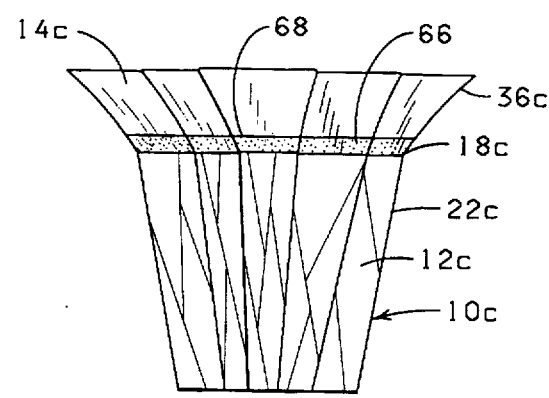
FIG. 8 is an elevational view of still another modified flower pot cover.

Shown in FIG. 8 is another modified flower pot cover 10c which is constructed exactly like the flower pot cover 10 shown in FIGS. 1 and 2 and described in detail before, except the flower pot cover 10c includes bonding material 66 on the outer peripheral surface 36c of the base 14c near the upper end 18c of the base 12c. The bonding material 66 extends circumferentially above the upper end 18c of the base 12c. The bonding material 66 extends on the skirt 14c from the upper end 18c of the base 12c to a line 68 spaced a distance from the upper end 18c of the base 12c.

In use, the flower pot cover 10c is disposed about a flower pot 44 and the crimped portion is formed by crimping together portions of the flower pot cover near and adjacent the bonding material 66 to form the crimped portion in a manner like that described before in connection with the flower pot cover 10 shown in FIG. 1, except the bonding material 66 is on the outer peripheral surface 36c of the base skirt 14c, rather than the inner peripheral surface as is the case with the flower pot cover 10 shown in FIG. 1.

EMBODIMENT OF FIG. 9

Figure 9:
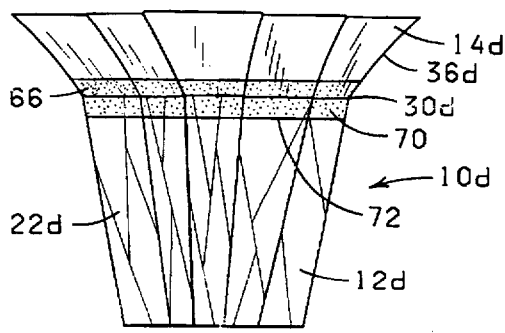
FIG. 9 is an elevational view of still another modified flower pot cover.

Shown in FIG. 9 is a flower pot cover 10d which is constructed exactly like the flower pot cover 10c shown in FIG. 8 described in detail before, except the flower pot cover 10d also includes bonding material 70 on the outer peripheral surface 22d of the base 12d near the connection 30d. In this instance, the crimped portion is formed by crimping together portions of the base 12d and the skirt 14d having the bonding materials 70 and 66 and respectively thereon.

EMBODIMENT OF FIG. 10

Figure 10:
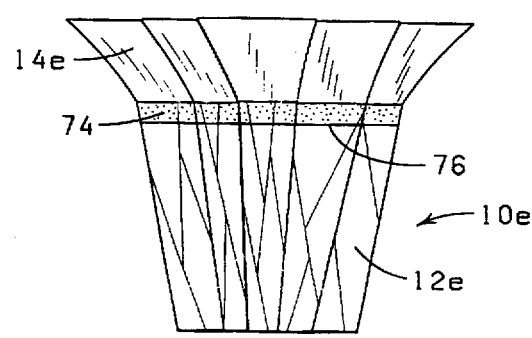
FIG. 10 is an elevational view of still another modified flower pot cover.

Shown in FIG. 10 is another modified flower pot cover 10e which is constructed exactly like the flower pot cover 10d, except the flower pot cover 10e does not include the bonding material 66 on the skirt. Rather, the flower pot cover 10e includes only a bonding material 74 on the base 12e which extends to a line 76. The flower pot cover 10e will operate to form the crimped portion in a manner exactly like that described before with respect to the flower pot covers 10c and 10d shown in FIGS. 8 and 9, except the crimped portion only will be formed by crimping together portions of the bonding material 74 on the base 12e.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A flower pot cover disposable about a flower pot comprising:

a preformed base sized to contain the flower pot and having an upper end, a lower end, an outer peripheral surface and a pot opening formed through the upper end thereof providing access to a pot receiving space, the pot receiving space forming an inner peripheral surface in the base, a bonding material being disposed upon a portion of the base for forming a crimped portion in the base after the pot has been disposed within the pot receiving space, the crimped portion cooperating to maintain the base disposed about a flower pot disposed therein, wherein portions of the crimped portion are bonded together by the bonding material after the pot has been disposed within the pot receiving space.

2. The flower pot cover of claim 1 wherein the upper end of the base is disposable above the upper end of the flower pot when the flower pot is disposed in the pot receiving space and wherein the crimped portion when formed is positioned above the upper end of the flower pot when the flower pot is disposed in the pot receiving space.

3. The flower pot cover of claim 2 wherein the crimped portion is defined further as extending circumferentially about the base.

4. The flower pot cover of claim 1 wherein the bonding material is defined further as being disposed on the inner peripheral surface of the base near the upper end of the base.

5. The flower pot cover of claim 1 wherein the bonding material is defined further as being disposed on the outer peripheral surface of the base near the upper end of the base.

6. The flower pot cover of claim 1 further comprising:

a skirt connected to the upper end of the base, the skirt extending a distance outwardly from the base terminating with an outer periphery, the skirt having an outer peripheral surface and an inner peripheral surface, a bonding material being disposed on the skirt, the crimped portion being formed by crimping together portions of the skirt and the base having the bonding material thereon.

7. The flower pot cover of claim 6 wherein the bonding material on the skirt is defined further as extending circumferencially about the skirt and being disposed near the upper end of the base.

8. The flower pot cover of claim 6 wherein the bonding material on the skirt is defined further as being disposed on the inner peripheral surface of the skirt.

9. The flower pot cover of claim 6 wherein the bonding material is defined further as being disposed on the outer peripheral surface of the skirt and near the upper end of the base.

10. A flower pot cover disposable about a flower pot comprising:

a preformed base sized to contain the flower pot and having an upper end, a lower end, an outer peripheral surface and a pot opening formed through the upper end thereof providing access to a pot receiving space forming an inner peripheral surface of the base;

a skirt connected to the upper end of the base, the skirt extending a distance outwardly from the upper end of the base terminating with an outer periphery, the skirt having an outer peripheral surface and an inner peripheral surface, a bonding material being disposed on the skirt near the connection of the skirt to the base for forming a crimped portion in the skirt after the pot has been disposed within the pot receiving space, the crimped portion cooperating to hold the flower pot cover on a flower pot disposed therein, wherein portions of the crimped portion are bonded together by the bonding material after the pot has been disposed within the pot receiving space.

11. The flower pot cover of claim 10 wherein the crimped portion extends circumferentially near the upper end of the base.

12. The flower pot cover of claim 10 wherein the bonding material is defined further as being disposed on the inner peripheral surface of the skirt.

13. The flower pot cover of claim 10 wherein the bonding material is defined further as being disposed on the outer peripheral surface of the skirt.

14. The flower pot cover of claim 1 wherein the bonding material is defined further as being an adhesive.

15. The flower pot cover of claim 1 wherein the bonding material is defined further as being a cohesive.

16. The flower pot cover of claim 10 wherein the bonding material is defined further as being an adhesive.

17. The flower pot cover of claim 10 wherein the bonding material is defined further as being a cohesive.

18. The flower pot cover of claim 1 wherein the crimped portion is defined further as extending radially inwardly over the upper end of the flower pot when the flower pot is disposed in the pot receiving space.

19. A flower pot cover disposable about a flower pot comprising:

a preformed base sized to contain the flower pot and having an upper end, a lower end, an outer peripheral surface and a flower pot opening formed through the upper end of the base providing access to a pot receiving space, the pot receiving space forming an inner peripheral surface in the base;

a skirt connected to the upper end of the base, the skirt extending a distance outwardly from the upper end of the base terminating with an outer periphery, the skirt having an outer peripheral surface and an inner peripheral surface, a bonding material being disposed on the skirt near the connection of the skirt to the base and on the base near the connection of the base to the skirt for forming a crimped portion in the cover after the pot has been disposed within the pot receiving space, the crimped portion cooperating to hold the flower pot cover on a flower pot disposed therein, wherein portions of the crimped portions are bonded together by the bonding material after the pot has been disposed within the pot receiving space.

20. The flower pot cover of claim 19 wherein the bonding material is defined further as extending circumferencially about the skirt near the upper end of the base and the crimped portion is defined further as extending circumferentially about the skirt near the upper end of the base.

21. The flower pot cover of claim 19 wherein the bonding material is defined further as being disposed on the inner peripheral surface of the skirt and the base.

22. The flower pot cover of claim 19 wherein the bonding material is defined further as being disposed on the outer peripheral surface of the skirt and the base.

23. The flower pot cover of claim 19 wherein the crimped portion is defined further as extending above the upper end of the flower pot when the flower pot is disposed in the pot receiving space of the base.

24. The flower pot cover of claim 19 wherein the bonding material is defined further as being an adhesive.

25. The flower pot cover of claim 19 wherein the bonding material is defined further as being a cohesive.

26. A flower pot cover disposable about a flower pot comprising:

a preformed base having an upper end, a lower end, an outer peripheral surface and a pot opening formed through the upper end thereof providing access to a pot receiving space forming an inner peripheral surface of the base; and a skirt extending a distance outwardly from the upper end of the base terminating with an outer periphery, the skirt having an outer peripheral surface and an inner peripheral surface, and having an adhesive or cohesive bonding material disposed upon at least one of the inner peripheral surface and outer peripheral surface of the skirt for forming a crimped portion in the skirt after placement of a flower pot into the pot receiving space, the crimped portion cooperating to hold the flower pot cover on a flower pot disposed therein, wherein portions of the skirt which are crimped together are bonded together by the adhesive or cohesive bonding material after the pot has been disposed within the pot receiving space.

27. The flower pot cover of claim 26 wherein the bonding material is defined further as being disposed on the inner peripheral surface of the skirt.

28. The flower pot cover of claim 26 wherein the bonding material is defined further as being disposed on the outer peripheral surface of the skirt.

29. The flower pot cover of claim 26 wherein the crimped portion is defined further as extending above the upper end of the flower pot when the flower pot is disposed in the pot receiving space of the base.

30. The flower pot cover of claim 26 wherein the bonding material is defined further as being a pressure sensitive adhesive.

31. The flower pot cover of claim 26 wherein the bonding material is defined further as being a pressure sensitive cohesive.

32. A plant package, comprising:

A flower pot cover comprising:

a preformed base having an upper end, a lower end, an outer peripheral surface and a pot opening formed through the upper end thereof providing access to a pot receiving space forming an inner peripheral surface of the base, and a skirt extending a distance outwardly from the upper end of the base terminating with an outer peripheral edge, the skirt having an outer peripheral surface and an inner peripheral surface, and having an adhesive or cohesive bonding material disposed upon a portion of at least one of the inner peripheral surface and the outer peripheral surface of the skirt for forming a crimped portion in the skirt; and a flower pot, disposed in the pot receiving space of the base and wherein a crimped portion is formed in the skirt for cooperating to hold the flower pot cover on the flower pot, wherein portions of the skirt are crimped together and are bonded together by the bonding material after the pot has been disposed within the pot receiving space.

33. The plant package of claim 32 wherein the crimped portion is above the upper end of the flower pot.

34. The plant package of claim 32 wherein the bonding material is defined further as being disposed on the inner peripheral surface of the skirt.

35. The plant package of claim 32 wherein the bonding material is defined further as being disposed on the outer peripheral surface of the skirt.

36. The plant package of claim 32 wherein the bonding material is defined further as being a pressure-sensitive adhesive.

37. The plant package of claim 32 wherein the bonding material is defined further as being a pressure-sensitive cohesive.

38. The plant package of claim 32 wherein the crimped portion is defined further as extending inwardly over the upper end of the flower pot.

* * * * *

UNITED STATES PATENT AND TRADEMARK OFFICE
CERTIFICATE OF CORRECTION

PATENT NO. : 5,718,081  Page 1 of 2
DATED : February 17, 1998
INVENTOR(S) : Weder et al.

It is certified that error appears in the above-identified patent and that said Letters Patent is hereby corrected as shown below:

On the title page, Item [22],"Related U.S. Application Data", line 6, please delete "5,344,016" and substitute therefor --5,809,629--.

On the title page, Item [22],"Related U.S. Application Data", line 7, after "Dec. 4, 1991," insert --Pat. No. 5,344,016,--.

Column 1, line 12, please delete "5,344,016" and substitute therefor --5,809,629--.

Column 1, line 16, after "METHOD"," insert --now U.S. Patent No. 5,344,016,--.

UNITED STATES PATENT AND TRADEMARK OFFICE
CERTIFICATE OF CORRECTION

PATENT NO. : 5,718,081
DATED : February 17, 1998
INVENTOR(S) : Weder et al.

It is certified that error appears in the above-identified patent and that said Letters Patent is hereby corrected as shown below:

Column 4, line 55, please delete "base 12" and substitute therefor --base 12a--.

Column 5, line 50, please delete "base 14c" and substitute therefor --skirt 14c--.

Column 5, line 62, please delete "base".

Column 6, line 6, please delete "70 and 66 and" substitute therefor --70 and 66--.

Column 7, line 67, please delete "keen" and substitute therefor --been--.

Signed and Sealed this

Eighth Day of June, 1999

Attest:

Q. TODD DICKINSON

Attesting Officer

Acting Commissioner of Patents and Trademarks